United States Patent
Takeuchi

(10) Patent No.: US 6,801,716 B2
(45) Date of Patent: Oct. 5, 2004

(54) FLASH CONTROL DEVICE, ELECTRONIC FLASH DEVICE, AND PHOTOGRAPHING SYSTEM

(75) Inventor: Hiroshi Takeuchi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/642,298

(22) Filed: Aug. 18, 2003

(65) Prior Publication Data

US 2004/0042774 A1 Mar. 4, 2004

(30) Foreign Application Priority Data

Aug. 27, 2002 (JP) ........................................ 2002-246684

(51) Int. Cl.[7] .............................................. G03B 15/02
(52) U.S. Cl. ........................................ 396/61; 396/157
(58) Field of Search ........................ 396/61, 157, 159, 396/166

(56) References Cited

U.S. PATENT DOCUMENTS 6,512,891 B2 * 1/2003 Matsui ....................... 396/157

FOREIGN PATENT DOCUMENTS

JP    A 5-45706    2/1993

* cited by examiner

Primary Examiner—Russell Adams
Assistant Examiner—Arthur A Smith
(74) Attorney, Agent, or Firm—Oliff & Berridge, PLC

(57) ABSTRACT

A flash control device comprises a distance input part, a calculating part, and an emission control part. When an electronic flash device is in an FP flash mode, the calculating part calculates a proper flash intensity according to an object distance, an f-number, and sensitivity, the f-number and the sensitivity of a camera. When the electronic flash device is in a discrete flash mode, the calculating part calculates a proper flash intensity according to an object distance, an f-number, and the sensitivity. The emission control part instructs the electronic flash device to flash with a proper flash intensity. The flash control device controls flashing so that the object is illuminated with a proper exposure amount.

20 Claims, 8 Drawing Sheets

FLASH CONTROL DEVICE, ELECTRONIC FLASH DEVICE, AND PHOTOGRAPHING SYSTEM

CROSS REFERENCE TO RELATED APPLICATION

This application is based upon and claims the benefit of priority from the prior Japanese Patent Application No. 2002-246684, filed on Aug. 27, 2002, the entire contents of which are incorporated herein by reference.

BACKGROUND OF THE INVENTION

1. Field of the Invention

The present invention relates to an electronic flash device for use with a camera, in particular, to a control device for use with an electronic flash device. In addition, the present invention relates to a photographing system having an electronic flash device and a camera.

2. Description of the Related Art

A discrete flash and an FP flash are known as flash systems of electronic flash devices for use with cameras. The discrete flash system flashes immediately after a shutter curtain is fully opened. On the other hand, the FP flash system repeatedly flashes, during the entire slit exposure with a shutter curtain not fully opened, at time intervals as the flashes are recognizable as flat light. The flash duration of the FP flash is longer than that of the discrete flash. Thus, the FP flash consumes much power than the discrete flash. As a result, the maximum flash intensity (referred to as 1/1 flash) of the FP flash is smaller than that of the discrete flash.

Japanese Unexamined Patent Publication Application No. HEI 5-45706 discloses a photographing system that performs the FP flash. A camera and a flash device of the photographing system share information of an object distance, an f-number of a lens, an exposure time (shutter speed), a film sensitivity, and so forth. The flash device is capable of selecting a flash duration that covers the exposure time. In addition, the flash device calculates a proper object distance at which an object is illuminated with a proper light amount based on data on a flash intensity, an f-number, a film sensitivity, and so forth that depend on a selected flash duration and displays the obtained proper object distance.

Also known is an electronic flash device that automatically switches a flash mode between the discrete flash mode and the FP flash mode depending on the exposure time and that allows the user to select one of flash intensities on display such as 1/1 flash, 1/2 flash, . . . , and 1/64 flash. Such an electronic flash device calculates a proper object distance for display in accordance with a selected flash intensity and a photographing condition such as an f-number.

In the foregoing photographing system, when a displayed proper object distance is different from an actual object distance, the user needs to adjust the system to reduce the difference for the purpose of taking a picture with a proper exposure amount. Specifically, the user needs to move or change a photographing condition such as an f-number to have the actual object distance closer to the displayed proper object distance. Thus, there has been demand for a photographing device that is able to set an appropriate photographing condition with less user's manipulation without changing the object distance.

In the foregoing electronic flash device, if the user does not want to change the object distance, he or she should select a flash intensity and then input several f-numbers until the displayed proper object distance is close to the actual object distance. For example, if the exposure time of the camera automatically increases because the luminance of an object has decreased, the flash mode is automatically switched from the FP flash mode to the discrete flash mode. In this case, even with the device in a photographing condition in which an object is illuminated with a proper exposure amount in the FP flash mode, the user should re-set an f-number in the discrete flash mode. Thus, the user should be familiar with the settings of both of the discrete flash mode and the FP flash mode. This is because even if the discrete flash and the FP flash are both the same 1/1 flash, the flash intensity of the discrete flash is different from that of the FP flash and the expression for obtaining the proper object distance in the discrete flash is different from that in the FP flash.

More specifically, the proper object distance in the discrete flash depends on the flash intensity, the f-number, and the film sensitivity. On the other hand, the proper object distance with the FP flash depends on the exposure time in addition to these parameters. In other words, obtaining a proper photographing condition in the FP flash is more complicated than that in the discrete flash because the FP flash requires one more parameters than the discrete flash. Meanwhile, there has been another demand for an electronic flash device that the user can easily set a photographing condition for setting a proper exposure amount in the same manner regardless of a type of flash mode.

SUMMARY OF THE INVENTION

An object of the present invention is to provide a flash control device that automatically sets a photographing condition for setting a proper exposure amount and eliminates the necessity for the user to change an object distance as much as possible.

Another object of the present invention is to provide a flash control device that properly switches the flash mode between the discrete flash mode and the FP flash mode and sets a photographing condition for setting a proper exposure amount, thereby eliminating the user's trouble in caring about the setting of the flash mode.

Another object of the present invention is to provide an electronic flash device that has the foregoing flash control device.

Another object of the present invention is to provide a photographing system that has the foregoing electronic flash device.

The present invention is a flash control device for use with an electronic flash device which has switchable flash modes as a discrete flash mode for a discrete flash and an FP flash mode for an FP flash. The flash control device comprises: a distance input part for inputting an object distance; a calculating part; and an emission control part. When the electronic flash device is in the FP flash mode, the calculating part calculates a proper flash intensity in accordance with the object distance and an f-number, a sensitivity, and an exposure time of a camera. The proper flash intensity refers to a degree of intensity necessary for illuminating an object with a proper light amount. When the electronic flash device is in the discrete flash mode, the calculating part calculates the proper flash intensity in accordance with the object distance, the f-number, and the sensitivity. The emission control part instructs the electronic flash device to flash with the proper flash intensity. The flash control device controls the flashing so that the object is illuminated with a proper exposure amount. Thus, the flash control device according to the present invention may realize an effect that even beginner-level users who are not familiar with flash settings as the discrete flash, the FP-flash, and so forth can easily set a flash intensity for setting a proper exposure amount.

According to one of the aspects of the flash control device of the present invention, when the electronic flash device is in the discrete flash mode, the calculating part calculates the proper flash intensity which is proportional to the square of the object distance and the square of the f-number and is inversely proportional to the sensitivity. When the electronic flash device is in the FP flash mode, the calculating part calculates the proper flash intensity which is proportional to the square of the object distance and the square of the f-number and is inversely proportional to the sensitivity and the exposure time.

According to another aspect of the flash control device of the present invention, when the exposure time is shorter than an X-Sync shutter speed of a shutter of the camera, the emission control part switches the flash mode of the electronic flash device to the FP flash mode. When the flash mode is switched, the calculating part calculates a new proper flash intensity without changing the object distance.

According to another aspect of the flash control device of the present invention, the calculating part determines whether or not the proper flash intensity is within a range in which the electronic flash device is emittable. When the proper flash intensity falls outside the emittable range, the calculating part calculates a modified value of at least one of the object distance, the f-number, the sensitivity, and the exposure time so as to correct the proper flash intensity to be a value in the emittable range. Modified values of the four items may be referred to as a recommended object distance, a recommended sensitivity, a recommended f-number, and a recommended exposure time, respectively.

According to another aspect of the flash control device of the present invention, when the electronic flash device is in the FP flash mode, the calculating part determines whether or not the proper flash intensity is larger than the maximum flash intensity of the FP flash. When determining that the proper flash intensity is larger than the maximum flash intensity, the calculating part instructs the camera to increase the f-number and lengthen the exposure time to a value longer than an X-Sync shutter speed of a shutter of the camera, and the emission control part switches the flash mode of the electronic flash device to the discrete flash mode. Thus, the flash control device according to the present invention may realize an effect that it is able to automatically set a suitable flash mode in which an object is illuminated with a proper exposure amount, thereby eliminating the user's trouble in keep in mind the setting of the flash mode as the discrete flash mode or the FP flash mode.

According to another aspect of the flash control device of the present invention, when the electronic flash device is in the discrete flash mode, the calculating part determines whether or not the proper flash intensity is larger than the maximum flash intensity of the discrete flash. When determining that the proper flash intensity is larger than the maximum flash intensity, the calculating part instructs the camera to perform at least one of an operation for decreasing the exposure time and the f-number and an operation for increasing the sensitivity. Accordingly, the flash control device of the present invention may realize an effect that it can automatically set a proper photographing condition even with the proper flash intensity falling outside the emittable range, thereby eliminating the user's trouble in changing the object distance.

According to another aspect of the flash control device of the present invention, when the electronic flash device is in the discrete flash mode, the calculating part determines whether or not the proper flash intensity is smaller than the minimum flash intensity of the discrete flash. When the determined result is affirmative, the emission control part switches the flash mode of the electronic flash device to the FP flash mode. Thus, the flash control device according to the present invention may realize an effect that it is able to select a suitable flash mode for setting a proper exposure amount, thereby eliminating the user's trouble in keeping in mind the setting of the flash mode as the discrete flash mode or the FP flash mode.

According to another aspect of the flash control device of the present invention, when the electronic flash device is in the FP flash mode, the calculating part determines whether or not the proper flash intensity is smaller than the minimum flash intensity of the FP flash. When the determined result is affirmative, the calculating part instructs the camera to decrease the sensitivity. Thus, the flash control device of the present invention may realize an effect that it is able to set a proper photographing condition even with the proper flash intensity falling outside the emittable range, thereby eliminating the user's trouble in changing the object distance.

According to another aspect of the flash control device of the present invention, the calculating part has an acquiring part for acquiring, as a measured distance, a distance between the object and the camera measured by the camera. The function of the acquiring part corresponds to, for example, that of the calculating part which is acquiring the measured distance from a CPU of the camera. The flash control device has a warning part for issuing a warning when the calculating part determines that the measured distance is largely different from the object distance. As an example of issuing the warning, a display part may be added thereto in order to display values of the measured distance and the object distance on the screen with blinking. Accordingly, the flash control device of the present invention may realize an effect that with user's erroneous object distance input, it can notify him or her of the error, thereby preventing him or her from taking a picture with an exposure amount that is outside the proper range. More preferably, it may be configured that without the object distance input, the calculating part calculates the proper flash intensity according to the measured distance instead of the object distance.

According to another aspect of the flash control device of the present invention, the calculating part determines whether or not the proper flash intensity is larger than the maximum flash intensity of the electronic flash device. When the determined result is affirmative, the calculating part calculates, as a recommended object distance, the object distance which allows the proper flash intensity to be a value closest to the maximum flash intensity of the electronic flash device. The calculating part also determines whether or not the proper flash intensity is smaller than the minimum flash intensity of the electronic flash device. When the determined result is affirmative, the calculating part calculates, as the recommended object distance, the object distance which allows the proper flash intensity to be a value closest to the minimum flash intensity of the electronic flash device. The flash control device further comprises a notifying part for notifying the user of the recommended object distance. To notify the user of the recommended object distance, a display part may be disposed so as to display a value of the recommended object distance on the screen with blinking (in this case, the function of the notifying part corresponds to that of the display part that displays the value of the recommended object distance with blinking). Thus, the flash control device of the present invention may realize an effect that the user is able to know how long the object distance should be altered in order to set a proper flash intensity for setting a proper exposure amount without changing other photographing conditions. In other words, the user can shoot an object with a proper exposure amount by only changing the object distance to the recommended object distance.

According to another aspect of the flash control device of the present invention, the calculating part determines whether or not the proper flash intensity is within a range in which the electronic flash device is emittable. When the maximum flash intensity of the electronic flash device has become smaller than the proper flash intensity due to a variance in at least one of the f-number, the exposure time, and an illuminating angle of a light-emitting part of the electronic flash device, the calculating part calculates, as a recommended object distance, the object distance which allows the proper flash intensity to be a value closest to the maximum flash intensity of the electronic flash device. When the minimum flash intensity of the electronic flash device has become larger than the proper flash intensity due to a variance in at least one of the f-number, the exposure time, and the illuminating angle, the calculating part calculates as the recommended object distance the object distance which allows the proper flash intensity to be a value closest to the minimum flash intensity of the electronic flash device. The flash control device further comprises a notifying part for notifying the user of the recommended object distance.

According to another aspect of the flash control device of the present invention, the calculating part determines whether or not the proper flash intensity is within a range in which the electronic flash device is emittable. The flash control device further comprises a warning part for issuing a warning when the proper flash intensity falls outside the emittable range of the electronic flash device because at least one of the f-number, the exposure time, and an illuminating angle of a light-emitting part of the electronic flash device. More preferably, it may be configured that the calculating part calculates, as a recommended object distance, an object distance which allows a proper flash intensity to be within an emittable range. The flash control device may comprise a display part for displaying the recommended object distance with blinking (in this case, the function of the warning part corresponds to that of the display part which is to display the recommended object distance with blinking).

An electronic flash device of the present invention comprises a flash control device and a light-emitting part. The electronic flash device has switchable flash modes as a discrete flash mode and an FP flash mode. The flash control device comprises a distance input part for inputting an object distance, a calculating part, and an emission control part. When the electronic flash device is in the FP flash mode, the calculating part calculates a proper flash intensity in accordance with the object distance and an f-number, a sensitivity, and an exposure time of a camera. The proper flash intensity refers to a degree of intensity necessary for illuminating an object with a proper light amount. When the electronic flash device is in the discrete flash mode, the calculating part calculates the proper flash intensity in accordance with the object distance, the f-number, and the sensitivity. The emission control part instructs the electronic flash device to flash with the proper flash intensity. The flash control device performs flash control so as to illuminate the object with a proper exposure amount. Thus, the electronic flash device according to the present invention may realize an effect that even beginner-level users who are not familiar with the settings of the flash modes as the discrete flash mode or FP flash mode can easily set a proper flash intensity for setting a proper exposure amount.

A photographing system of the present invention has an electronic flash device that has a flash control device and a light-emitting part and that has switchable flash modes of the discrete flash mode and the FP flash mode, and a camera having an image pickup part that picks up an image of an object. The image pickup part comprises, for example, a lens, an aperture, a shutter, and an image pickup device. The flash control device comprises a distance input part for inputting an object distance, a calculating part, and an emission control part. When the electronic flash device is in the FP flash mode, the calculating part calculates a proper flash intensity according to the object distance and an f-number, a sensitivity, and an exposure time of a camera. The proper flash intensity refers to a degree of intensity necessary for illuminating an object with a proper light amount. When the electronic flash device is in the discrete flash mode, the calculating part calculates the proper flash intensity according to the object distance, the f-number, and the sensitivity. The emission control part instructs the electronic flash device to flash with the proper flash intensity. The flash control device performs flash control so as to illuminate the object with a proper exposure amount. Thus, the photographic system of the present invention may realize an effect that even beginner-level users who are not familiar with the settings of the flash modes as the discrete flash mode or FP flash mode can easily set a proper flash intensity for setting a proper exposure amount.

BRIEF DESCRIPTION OF DRAWINGS

The nature, principle, and utility of the invention will become more apparent from the following detailed description when read in conjunction with the accompanying drawings in which parts are designated by identical reference numbers, in which.

DESCRIPTION OF THE PREFERRED EMBODIMENTS

Next, with reference to the accompanying drawings, an embodiment of the present invention will be described.

<Structure of Present Embodiment>

Figure 1:
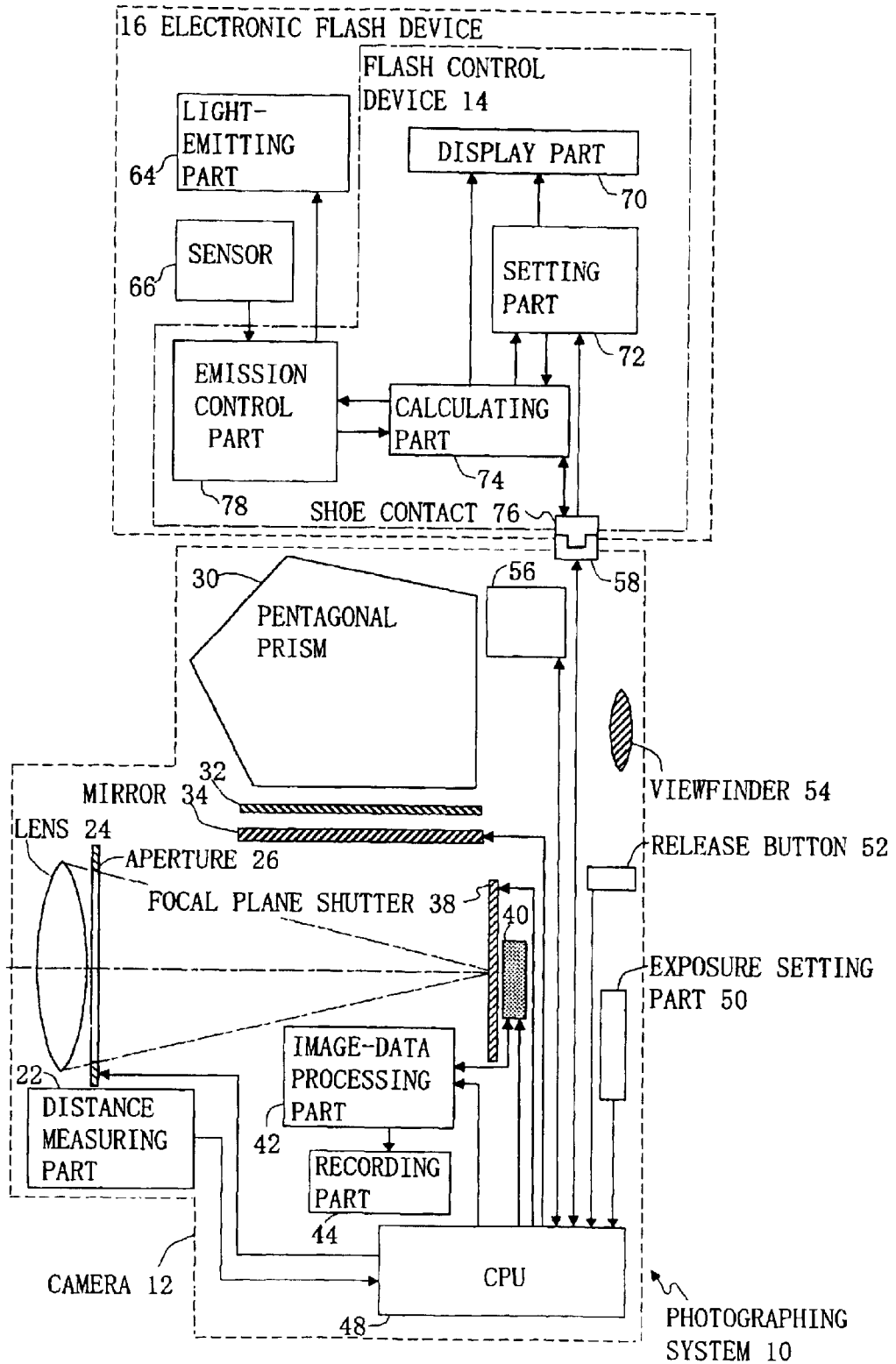
FIG. 1 is a block diagram showing the structure of a photographing system according to the present invention.

FIG. 1 is a block diagram showing the structure of a photographing system according to the present embodiment. A photographing system 10 is structured by attaching to a camera 12 an electronic flash device 16 that has a flash control device 14 of the present invention.

The camera 12 comprises a distance measuring part 22, a lens (shooting lens) 24, an aperture (diaphragm) 26, a pentagonal prism 30, a diffusion plate 32, a mirror 34, a focal plane shutter 38, a CCD 40, an image-data processing part 42, a recording part 44, a CPU 48, an exposure setting part 50, a release button 52, a viewfinder 54, a photometry part 56, a communication terminal 58.

The distance measuring part 22 measures the distance between a focused object and the lens 24 corresponding to the rotation angle of a focusing ring (not shown) and sends the measurement result as a measured distance to the CPU 48. In addition, the distance measuring part 22 sends the focal length of the lens 24 to the CPU 48. The lens 24 is a zoom lens that is composed of a plurality of lens elements. Without need to moving the focused position, the focal length of the lens 24 can be adjusted.

The CCD 40 receives reflected light of the object through the lens 24 and generates electric charge according to the amount of the received light.

The image-data processing part 42 reads electric charge from the CCD 40 and generates image data.

The recording part 44 records the image data in a flash memory (not shown).

The exposure setting part 50 has a button (not shown) with which the user sets a mode of the camera 12(the CPU 48 therein) to any of an automatic exposure mode, an f-number priority mode, a shutter speed priority mode, and a manual exposure mode. The exposure setting part 50 has a group of buttons with which the user inputs an f-number of the lens 24, an exposure time (shutter speed), and an ISO number (sensitivity) of the CCD 40. In the present specification the "sensitivity" in use for a film camera refers to a sensitivity of a film to light (ISO number of the film) and in use for an electronic camera refers to an ISO number of an image sensor.

Before an object is photographed, the photometry part 56 measures the luminance of the object and sends the measured luminance to the CPU 48.

When the release button 52 is pressed, it commands the CPU 48 to photograph the object.

The CPU 48 calculates a proper f-number and a proper exposure time in accordance with the luminance of the object received from the photometry part 56. The CPU 48 adjusts the gain of an output of the CCD 40 so as to adjust the sensitivity. The CPU 48 sends the f-number, the exposure time, and the sensitivity to the electronic flash device 16 side through the communication terminal 58. In addition, the CPU 48 sends the measured distance and the focal length received from the distance measuring part 22 to the electronic flash device 16 through the communication terminal 58.

The electronic flash device 16 has a light-emitting part 64, a sensor 66, and the foregoing flash control device 14. The electronic flash device 16 is capable of switching the flash mode between the discrete flash mode and the FP flash mode.

The light-emitting part 64 has a boosting part, a capacitor, and an xenon tube (that are not shown). The boosting part boosts a voltage supplied from a power supply (not shown) and charges the capacitor with the boosted voltage. The light-emitting part 64 supplies a current from the charged capacitor to the xenon tube so as to cause the xenon tube to emit light. The light-emitting part 64 adjusts an illuminating angle of the flash with an actuator (not shown) according to a command received from the flash control device 14.

When the light-emitting part 64 emits light, the sensor 66 measures a flash intensity thereof and outputs the measured flash intensity to the flash control device 14.

The flash control device 14 has a display part 70, a setting part 72, a calculating part 74, a shoe contact 76, and an emission control part 78.

The setting part 72 has a group of operation buttons (not shown) with which the user inputs an object distance. The setting part 72 sends the object distance and the f-number, the sensitivity, the exposure time, and the focal length received from the CPU 48 to the display part 70.

The display part 70 displays the object distance, the f-number, the sensitivity, the exposure time, and the focal length. In addition, the display part 70 displays a recommended object distance (that will be described later) according to a command received from the calculating part 74.

The shoe contact 76 is connected to the communication terminal 58 of the camera 12. The shoe contact 76 functions as a contact through which data is exchanged among the calculating part 74, the setting part 72, and the CPU 48.

The emission control part 78 sets the light-emitting part 64 to either the discrete flash mode or the FP flash mode according to a command received from the calculating part 74. The emission control part 78 receives an angle of view from the calculating part 74. The emission control part 78 commands the light-emitting part 64 to set the illuminating angle of the light-emitting part 64 to be slightly larger than the angle of view. According to the present embodiment, the value of the illuminating angle determines the range of emittable amounts of light per unit solid angle, namely the maximum flash intensity and the minimum flash intensity of the light-emitting part 64.

The calculating part 74 calculates the maximum flash intensity and the minimum flash intensity of the light-emitting part 64 in each of the discrete flash mode and the FP flash mode in accordance with the angle of view that depends on the focal length received from the CPU 48. The calculating part 74 calculates a proper flash intensity in each of the discrete flash mode and the FP flash mode according to the object distance, the f-number, the sensitivity, and the exposure time received from the CPU 48. First of all, the discrete flash mode will be described. Since the size of the light-emitting part 64 of the electronic flash device 16 of the present embodiment is small, the light-emitting part 64 can be almost regarded as a point light source. Thus, in the electronic flash device 16 of the present embodiment, the proper flash intensity in the discrete flash mode (hereinafter referred to as proper discrete flash intensity Id) can be given by the following expression.

$$Id = C \times D^2 \times F^2 \div S \qquad (1)$$

where C represents a constant, D represents an object distance, F represents an f-number, and S represents a sensitivity (ISO number). When the logarithms of both the sides to the base 2 are taken, the following expression is satisfied.

$$\log_2 Id = (\log_2 C) + (\log_2 D^2) + (\log_2 F^2) - (\log_2 S) \qquad (2)$$

When the logarithm of the proper discrete flash intensity Id to the base 2 is denoted by Idv, the logarithm of the constant C to the base 2 is denoted by Cv, the logarithm of the square of the object distance D to the base 2 is denoted by Dv, the logarithm of the square of the f-number F to the base 2 is denoted by Fv, and the logarithm of the sensitivity S to the base 2 is denoted by Sv, then the following expression is satisfied.

$$Idv = Cv + Dv + Fv - Sv \quad (3)$$

The calculating part 74 calculates the proper discrete flash intensity Id using expression (3). In addition, expression (3) can be used for calculating a recommended sensitivity, a recommended f-number, and a recommended exposure time that will be described later.

Next, the FP flash mode will be described. When the exposure time is denoted by T, the proper flash intensity (hereinafter referred to as proper FP flash intensity Ifp) is generally given by the following expression.

$$Ifp = B \times D^2 \times F^2 \div S \div T \quad (4)$$

where B represents a constant. When the logarithms of both the sides to the base 2 are taken, the following expression is satisfied.

$$\log_2 Ifp = (\log_2 B) + (\log_2 D^2) + (\log_2 F^2) - (\log_2 S) - \{\log_2(1/T)\} \quad (5)$$

When the logarithm of the proper FP flash intensity Ifp to the base 2 is denoted by Ifpv, the logarithm of the constant B to the base 2 is denoted by Bv, and the logarithm of the reciprocal of the exposure time T to the base 2 is denoted by Tv, then the following expression is satisfied.

$$Ifpv = Bv + Dv + Fv - Sv + Tv \quad (6)$$

The calculating part 74 calculates the proper FP flash intensity Ifp using expression (6). In addition, expression (6) is also used for calculations for obtaining a recommended sensitivity, a recommended f-number, and a recommended exposure time that will be described later. When the object distance is not input, the calculating part 74 uses the measured distance received from the CPU 48 instead of the object distance.

Figure 2:
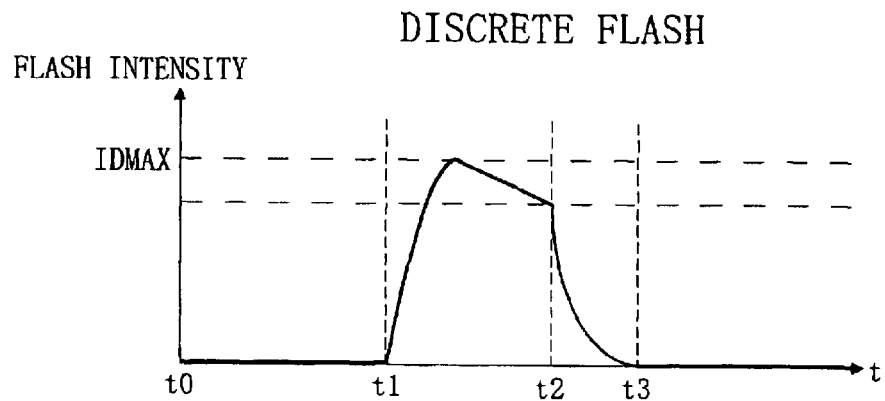
FIG. 2 is a schematic diagram describing an example of a chronological variation of a flash intensity with a discrete flash.

FIG. 2 shows an example of a chronological variation of the flash intensity in the discrete flash mode. When the emission control part 78 instructs the discrete flash, the emission control part 78 receives a flash start signal from the CPU 48 of the camera 12 through the calculating part 74 in synchronization with the full opening of the focal plane shutter 38. In synchronization with the receiving, the emission control part 78 commands the light-emitting part 64 to start flashing (at time t1 of FIG. 2). In addition, the emission control part 78 integrates the output of the sensor 66 with respect to time. When the integrated value of the output of the sensor 66 with respect to time reaches a target value (at time t2 of FIG. 2), the emission control part 78 commands the light-emitting part 64 to stop flashing.

Figure 3:
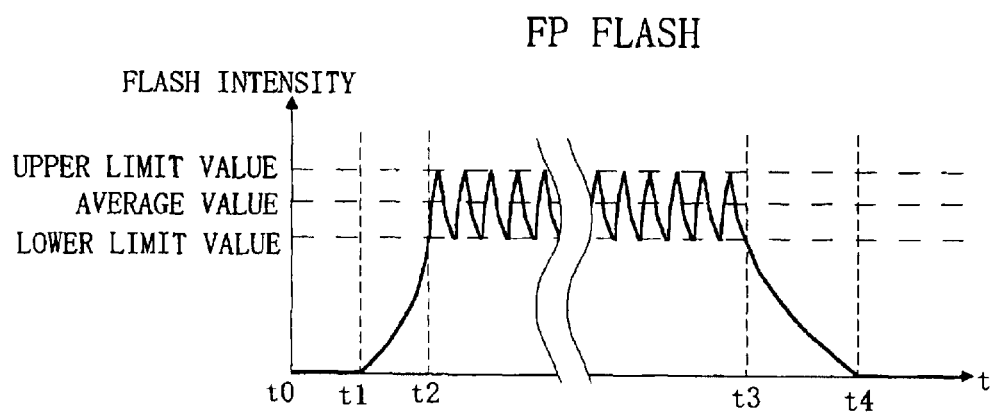
FIG. 3 is a schematic diagram describing an example of a chronological variation of a flash intensity with an FP flash.

FIG. 3 shows an example of the chronological variation of the flash intensity in the FP flash mode. For the FP flash, the emission control part 78 controls the light-emitting part 64 to always emit flash with constant flash intensity per unit time. Specifically, when the output of the sensor 66 reaches the upper limit value, the emission control part 78 stops a current flow that flows from the capacitor to the xenon tube so as to decrease the flash intensity. When the output of the sensor 66 reaches the lower limit value, the emission control part 78 resumes the current flow from the capacitor to the xenon tube so as to increase the flash intensity. At this point, the period for which the flash intensity decreases from the upper limit value to the lower limit value and then increases from the lower limit value to the upper limit value is sufficiently shorter than the shortest shutter speed of the focal plane shutter 38. Thus, the light receiving plane of the CCD 40 is exposed with a constant light amount during the total shutter release time. In addition, the emission control part 78 controls the light-emitting part 64 so that the total shutter release time is included in the period for which the flash intensity is constant (from time t2 to t3 of FIG. 3).

<Description of Photographing Operation>

Figure 4:
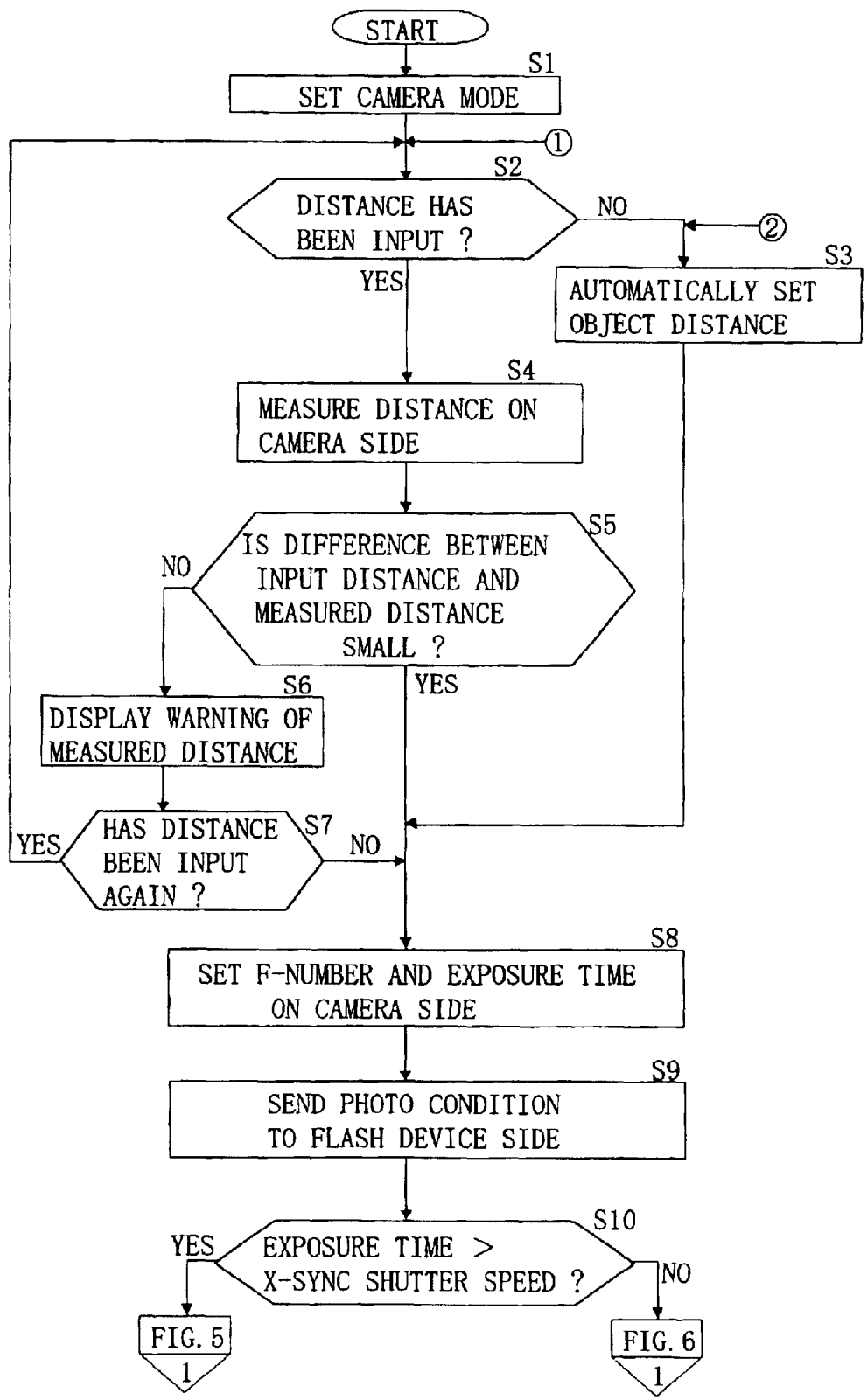
FIG. 4 is a flow chart showing a beginning part of a flow chart of an operation of the photographing system according to the present invention.
Figure 5:
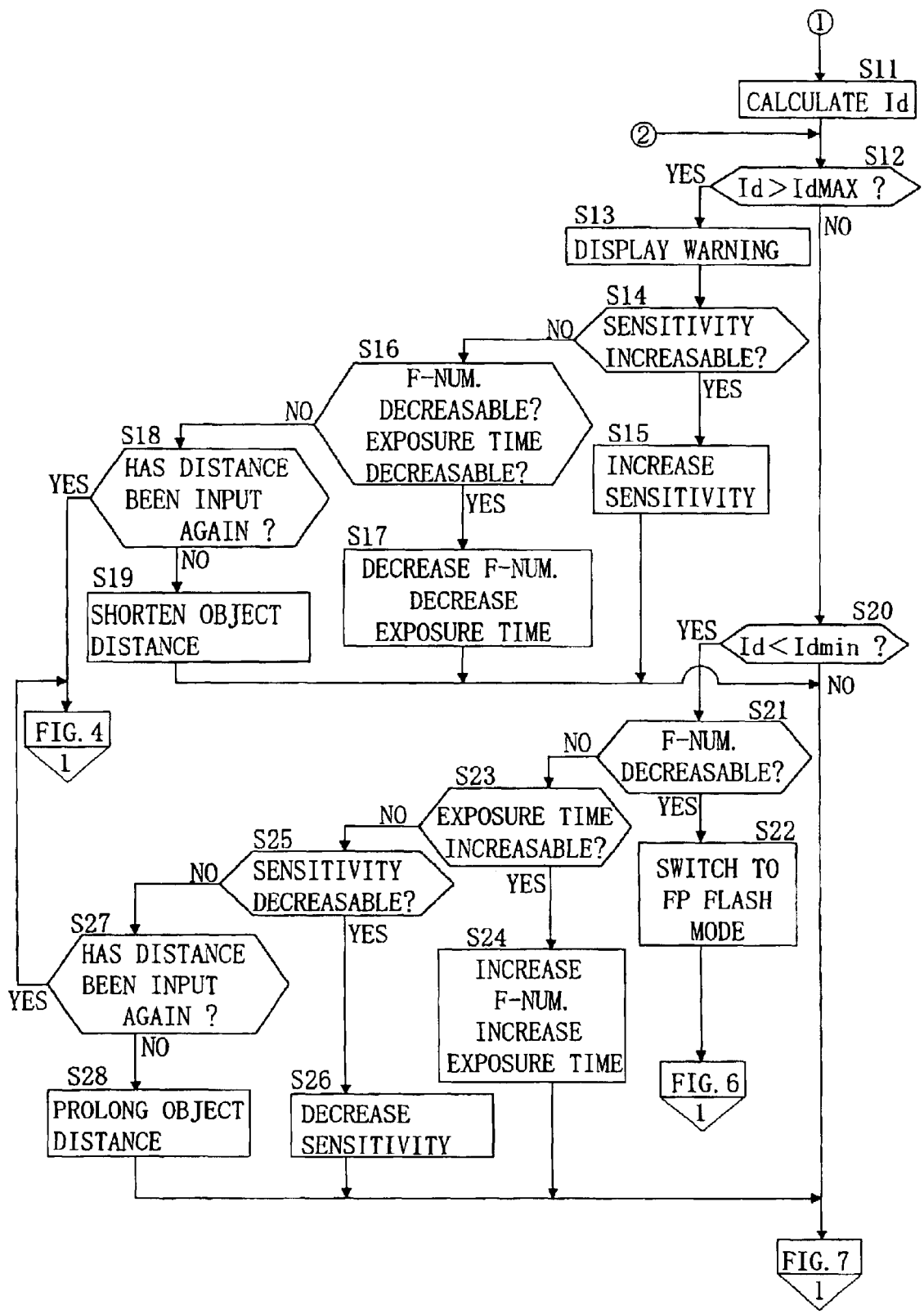
FIG. 5 is a flow chart describing a processing performed after the flash mode is switched to the discrete flash mode in the last process of FIG. 4.
Figure 6:
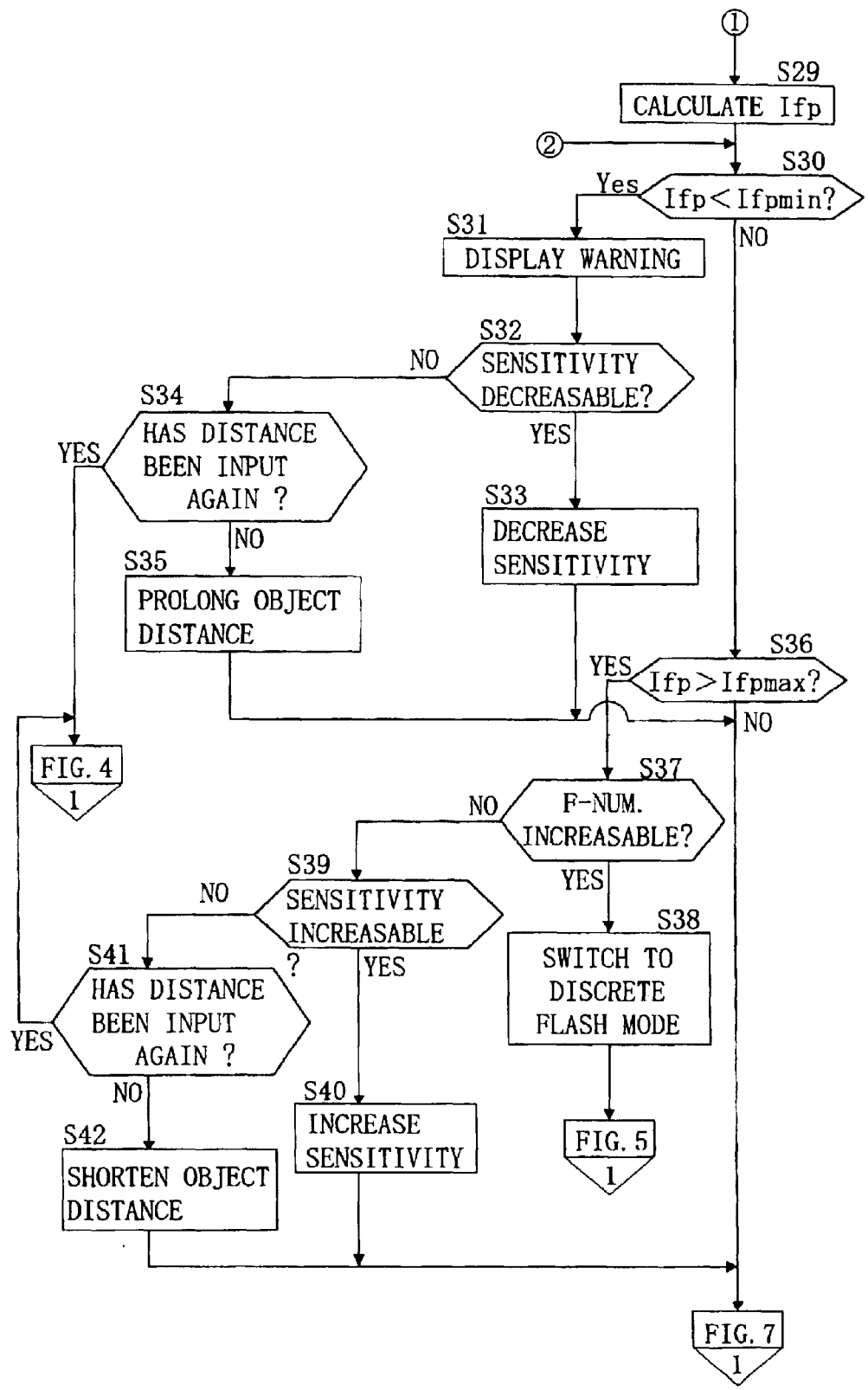
FIG. 6 is a flow chart describing a process after the FP flash mode is set in the last process of FIG. 4.
Figure 7:
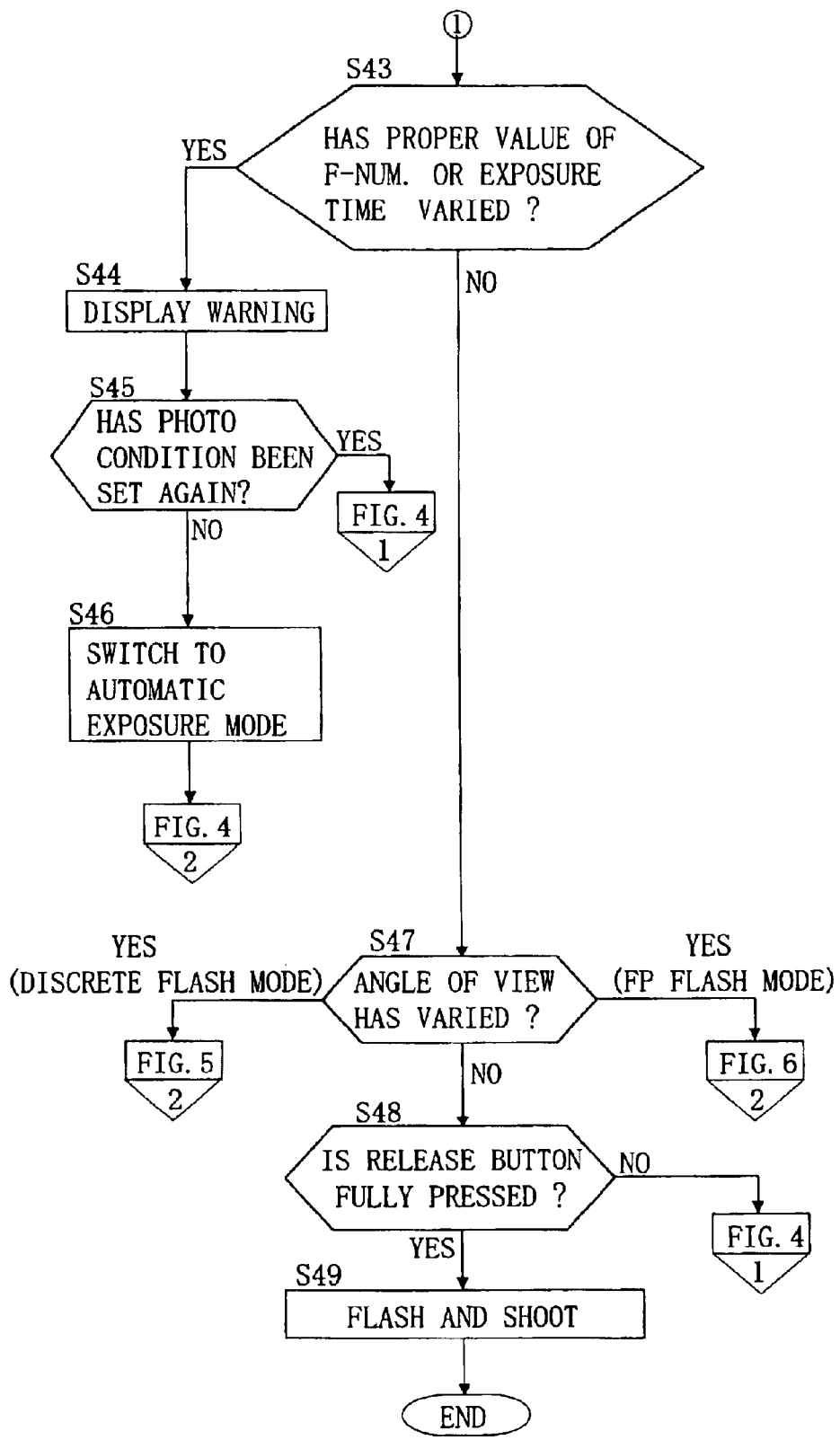
FIG. 7 is a flow chart showing the last part of the flow chart of the operation of the photographing system according to the present invention.

FIG. 4 shows a beginning of a flow chart for the operation of the photographing system 10. FIG. 5 is a flow chart describing a process after the light-emitting part 64 is switched to the discrete flash mode. FIG. 6 is a flow chart describing a process after the light-emitting part 64 is set to the FP flash mode at the end of the process of FIG. 4. FIG. 7 shows the last part of the flow chart of the operation of the photographing system 10. Next, according to step numbers of FIG. 4 to FIG. 7, the control of the photographing system 10 will be described. In the following control, for example, the maximum flash intensity in the discrete flash mode is larger than that in the FP flash mode. In contrast, the minimum flash intensity in the FP flash mode is smaller than that in the discrete flash mode.

[Step 1]

The camera 12 and the electronic flash device 16 are on. By operating the exposure setting part 50, the user sets the camera 12 to one of the automatic exposure mode, the f-number priority mode, the shutter speed priority mode, and the manual exposure mode. In addition, the user focuses the lens 24 on an object and adjusts the focal length (i.e., angle of view) of the lens 24. Thereafter, the flow advances to step S2.

[Step 2]

When the user inputs the object distance to the setting part 72, the calculating part 74 receives the object distance from the setting part 72. The display part 70 displays the input object distance. Thereafter, the flow advances to step S4. When the object distance has not been input, the flow advances to step S3.

[Step S3]

The distance measuring part 22 detects as a measured distance the distance between the object and the lens 24. The distance measuring part 22 outputs the measured distance and the focal length to the CPU 48. The CPU 48 sends the measured distance and the focal length to the calculating part 74 and the setting part 72. The calculating part 74 and the setting part 72 cause the set value of the object distance to become the same as the received measured distance. The display part 70 displays the measured distance as an object distance. Thereafter, the flow advances to step S8.

[Step S4]

The distance measuring part 22 detects as a measured distance the distance between the focused object and the lens 24. The distance measuring part 22 outputs the measured distance and the focal length to the CPU 48. The CPU 48 sends the measured distance and the focal length to the calculating part 74. In addition, the CPU 48 sends the focal length to the setting part 72. The calculating part 74 calculates an angle of view from the received focal length. Thereafter, the flow advances to step S5.

[Step S5]

The calculating part 74 determines whether or not the difference between the object distance and the measured distance is in an allowable range. The "allowable range" may vary as long as an appropriate amount of exposure is secured. When the difference between the object distance and the measured distance is in the allowable range, the flow advances to step S8 shown in FIG. 4. Otherwise, the flow advances to step S6.

[Step S6]

The calculating part 74 sends the measured distance to the display part 70. The display part 70 for example displays values of both of the object distance and the measured distance on the screen with blinking so as to warn the user that a difference between the input object distance and the distance measured by the camera is large. Thereafter, the setting part 72 switches the current screen to a screen for object distance input so as to prompt the user to re-input. Thereafter, the flow advances to step S7.

[Step S7]

When the user has selected the re-input of the object distance, the flow returns to step S2. When the user has not selected the re-input of the object distance, the display part 70 clears the display of the measured distance. Thereafter, the flow advances to step S8.

[Step S8]

The photometry part 56 measures the luminance of the object and sends the measured luminance to the CPU 48.

When the camera 12 is in the automatic exposure mode, the CPU 48 sets the f-number and the exposure time for their proper values according to the luminance of the object.

When the camera 12 is in the f-number priority mode, the CPU 48 sets the exposure time for a proper value according to both the f-number that the user inputs to the exposure setting part 50 and the luminance of the object.

When the camera 12 is in the shutter speed priority mode, the CPU 48 sets the f-number for a proper value according to both the exposure time that the user inputs to the exposure setting part 50 and the luminance of the object.

When the camera 12 is in the manual exposure mode, the CPU 48 sets the f-number, the exposure time, and the ISO value at values that the user has input to the exposure setting part 50.

Thereafter, the flow advances to step S9. The photometry part 56 continues to measure the luminance of the object until the user fully presses the release button 52 (at step S48 shown in FIG. 7).

[Step S9]

The CPU 48 sends the f-number, the sensitivity, and the exposure time to the setting part 72. The display part 70 receives the f-number, the sensitivity, and the exposure time from the setting part 72 and displays these values. The CPU 48 sends the f-number, the sensitivity, the exposure time, and the X-Sync shutter speed to the calculating part 74. In this case, the X-Sync shutter speed is the smallest value of the exposure time enough to secure for example the full opening of the shutter (in this example, the focal plane shutter 38). Thereafter, the flow advances to step S10.

[Step S10]

When the exposure time is longer than the X-Sync shutter speed, the calculating part 74 commands the emission control part 78 to cause the light-emitting part 64 to operate in the discrete flash mode. Thereafter, the flow advances to step S11. When the exposure time is equal to or shorter than the X-Sync shutter speed, the calculating part 74 commands the emission control part 78 to cause the light-emitting part 64 to operate in the FP flash mode. Thereafter, the flow advances to step S29.

[Step S11]

The calculating part 74 calculates the proper discrete flash intensity Id using the foregoing expression (3). Thereafter, the flow advances to step S12.

[Step S12]

The calculating part 74 calculates the maximum flash intensity and the minimum flash intensity in the discrete flash mode of the light-emitting part 64 according to the angle of view (hereinafter they are referred to as maximum discrete flash intensity Idmax and minimum discrete flash intensity Idmin, respectively). When the proper discrete flash intensity Id is equal to or smaller than the maximum discrete flash intensity Idmax (determined by the calculating part 74), the flow advances to step S20. When the proper discrete flash intensity Id is larger than the maximum discrete flash intensity Idmax, the flow advances to step S13.

[Step S13]

The calculating part 74 calculates as a recommended object distance an object distance which allows the proper discrete flash intensity Id to be equal to the maximum discrete flash intensity Idmax. The recommended object distance is shorter than the object distance displayed on the display part 70. The display part 70 for example displays both of the object distance and the recommended object distance with blinking so as to warn the user that the value of the object distance is too large. Thereafter, the flow advances to step S14.

[Step S14]

The calculating part 74 communicates with the CPU 48 and determines whether or not the sensitivity can be increased. When the sensitivity cannot be increased, the flow advances to step S16. When the sensitivity can be increased, the flow advances to step S15.

[Step S15]

The calculating part 74 calculates as a recommended sensitivity a sensitivity which allows the proper discrete flash intensity Id to be equal to the maximum discrete flash intensity Idmax. The calculating part 74 commands the CPU 48 to increase the sensitivity to the recommended sensitivity. Accordingly, the CPU 48 changes the sensitivity. The calculating part 74 and the setting part 72 change the set value of the sensitivity to the recommended sensitivity. The display part 70 changes the displayed value of the sensitivity to the recommended sensitivity. In addition, the display part 70 clears the display of the recommended object distance. Thereafter, the flow advances to step S43 shown in FIG. 7.

[Step S16]

The calculating part 74 communicates with the CPU 48 and determines whether or not both the f-number and the exposure time can be decreased. When at least one of them cannot be decreased, the flow advances to step S18. When both of them can be decreased, the flow advances to step S17.

[Step S17]

The calculating part 74 calculates as a recommended f-number an f-number which allows the proper discrete flash intensity Id to be equal to the maximum discrete flash intensity Idmax. The recommended f-number is smaller than the set f-number. In addition, the calculating part 74 calculates as a recommended exposure time an exposure time which allows the exposure value Ev given by the following expression not to vary even if the f-number is changed to the recommended f-number.

$$Ev = \log_2(F^2/T) \tag{7}$$

The recommended exposure time is shorter than the set exposure time. The calculating part 74 commands the CPU 48 to decrease the f-number and the exposure time to the recommended f-number and the recommended exposure time, respectively. Accordingly, the CPU 48 changes the f-number and the exposure time. The calculating part 74 changes the proper discrete flash intensity Id to the value equal to the maximum discrete flash intensity Idmax. The calculating part 74 sends the changed f-number and the changed exposure time to the setting part 72. The display part 70 changes the displayed value of the f-number to the recommended f-number, changes the displayed value of the exposure time to the recommended exposure time, and clears the display of the recommended object distance. Thereafter, the flow advances to step S43.

[Step S18]

The display part 70 has already displayed the recommended object distance (at step S13). The setting part 72 causes the display part 70 to switch the current screen to the screen for object distance input so as to prompt the user to re-input the object distance. When the user has selected the re-input of the object distance, the flow returns to step S2 shown in FIG. 2. When the user has not selected the re-input of the object distance, the flow advances to step S19.

[Step S19]

The calculating part 74 and the setting part 72 change the set value of the object distance to the recommended object distance. The display part 70 clears the display of the recommended object distance. In addition, the display part 70 changes the displayed value of the object distance to the recommended object distance. The calculating part 74 changes the proper discrete flash intensity Id to the value equal to the maximum discrete flash intensity Idmax. Thereafter, the flow advances to step S43. To shoot an object with a proper exposure amount, the user needs to move to have the actual object distance closer to the value displayed on the display part 70.

[Step S20]

When the proper discrete flash intensity Id is equal or larger than the minimum discrete flash intensity Idmin (determined by the calculating part 74), the flow advances to step S43. When the proper discrete flash intensity Id is smaller than the minimum discrete flash intensity Idmin, the flow advances to step S21.

[Step S21]

The calculating part 74 communicates with the CPU 48 and determines whether or not the f-number can be decreased. When the f-number cannot be decreased, the flow advances to step S23. When the f-number can be decreased, the flow advances to step S22.

[Step S22]

The calculating part 74 sets for a recommended exposure time an exposure time equal to or shorter than the X-sync shutter speed. In addition, the calculating part 74 calculates as a recommended f-number an f-number which allows the exposure time Ev given by expression (7) not to vary even if the exposure time is changed to the recommended exposure time. The calculating part 74 commands the CPU 48 to change the exposure time and the f-number to the recommended exposure time and the recommended f-number, respectively. Accordingly, the CPU 48 changes the exposure time and the f-number. The calculating part 74 and the setting part 72 change the set values of the f-number and the exposure time to the recommended exposure time and the recommended f-number, respectively. The display part 70 changes the displayed values of the f-number and the exposure time to the recommended exposure time and the recommended f-number, respectively. The emission control part 78 causes the light-emitting part 64 to switch the flash mode to the FP flash mode. Thereafter, the flow advances to step S29.

[Step S23]

The calculating part 74 communicates with the CPU 48 and determines whether or not both the f-number and the exposure time can be increased. When at least one of them cannot be increased, the flow advances to step S25. When both of them can be increased, the flow advances to step S24.

[Step S24]

The calculating part 74 calculates as a recommended f-number an f-number which allows the proper discrete flash intensity Id to be equal to the minimum discrete flash intensity Idmin. The recommended f-number is larger than the f-number displayed on the display part 70. In addition, the calculating part 74 calculates as a recommended exposure time an exposure time which allows the exposure value Ev given by expression (7) not to vary even if the f-number is changed to the recommended f-number. The recommended exposure time is longer than the set exposure time. The calculating part 74 commands the CPU 48 to change the exposure time and the f-number to the recommended exposure time and the recommended f-number, respectively. Accordingly, the CPU 48 changes the exposure time and the f-number. The calculating part 74 changes the proper discrete flash intensity Id to the value equal to the minimum discrete flash intensity Idmin. The calculating part 74 and the setting part 72 change the set values of the f-number and the exposure time to the recommended exposure time and the recommended f-number, respectively. The display part 70 changes the displayed values of the f-number and the exposure time to the recommended exposure time and the recommended f-number, respectively. Thereafter, the flow advances to step S43.

[Step S25]

The calculating part 74 communicates with the CPU 48 and determines whether or not the sensitivity can be decreased. When the sensitivity cannot be decreased, the flow advances to step S27. When the sensitivity can be decreased, the flow advances to step S26.

[Step S26]

The calculating part 74 calculates as a recommended sensitivity a sensitivity of which the proper discrete flash intensity Id becomes equal to the minimum discrete flash intensity Idmin. The calculating part 74 commands the CPU 48 to decrease the sensitivity to the recommended sensitivity. Accordingly, the CPU 48 changes the sensitivity. The calculating part 74 changes the proper discrete flash intensity Id to the value equal to the minimum discrete flash intensity Idmin. The calculating part 74 and the setting part 72 change the set value of the sensitivity to the recommended sensitivity. The display part 70 changes the displayed value of the sensitivity to the recommended sensitivity and clears the display of the recommended object distance. Thereafter, the flow advances to step S43 shown in FIG. 7.

[Step S27]

The calculating part 74 calculates as a recommended object distance an object distance which allows the proper discrete flash intensity Id to be equal to the minimum discrete flash intensity Idmin. The recommended object distance is larger than the object distance displayed on the display part 70. The display part 70 for example displays the recommended object distance along with the object distance with blinking so as to warn the user that the value of the object distance is too small. The setting part 72 causes the display part 70 to switch the current screen to the screen for object distance input so as to prompt the user to re-input the object distance. With the user's selection of the re-input of the object distance, the flow returns to step S2 shown in FIG. 4. With the user's unselection of the re-input thereof, the flow advances to step S28.

[Step S28]

The calculating part 74 and the setting part 72 change the set value of the object distance to the recommended object distance. The display part 70 clears the display of the recommended object distance. In addition, the display part 70 changes the displayed value of the object distance to the recommended object distance. The calculating part 74 changes the proper discrete flash intensity Id to the value equal to the minimum discrete flash intensity Idmin. To shoot an object with a proper exposure amount, the user needs to move so as to have the actual object distance closer to the value displayed on the display part 70. Thereafter, the flow advances to step S43 shown in FIG. 7.

[Step S29]

Step S29 is a processing to be performed in a case where the exposure time is equal to or shorter than X seconds in Step S10 shown in FIG. 4. The calculating part 74 calculates the proper FP flash intensity Ifp using expression (6). Thereafter, the flow advances to step S30.

[Step S30]

The calculating part 74 calculates the maximum flash intensity and the minimum flash intensity in the FP flash mode of the light-emitting part 64 in accordance with the angle of view (hereinafter, they are referred to as maximum FP flash intensity Ifpmax and minimum FP flash intensity Ifpmin, respectively). When the proper FP flash intensity Ifp is equal to or larger than the minimum FP flash intensity Ifpmin (determined by the calculating part 74), the flow advances to step S36. When the proper FP flash intensity Ifp is smaller than the minimum FP flash intensity Ifpmin, the flow advances to step S31.

[Step S31]

The calculating part 74 calculates as a recommended object distance an object distance of which allows the proper FP flash intensity Ifp to be equal to the minimum FP flash intensity Ifpmin. The recommended object distance is larger than the object distance displayed on the display part 70. The display part 70 for example displays values of both of the object distance and the recommended object distance with blinking so as to warn the user that the value of the object distance is too small. Thereafter, the flow advances to step S32.

[Step S32]

The calculating part 74 communicates with the CPU 48 and determines whether or not the sensitivity can be decreased. When the sensitivity cannot be decreased, the flow advances to step S34. When the sensitivity can be decreased, the flow advances to step S33.

[Step S33]

The calculating part 74 calculates as a recommended sensitivity a sensitivity which allows the proper FP flash intensity Ifp to be equal to the minimum FP flash intensity Ifpmin. The calculating part 74 commands the CPU 48 to decrease the sensitivity to the recommended sensitivity. Accordingly, the CPU 48 changes the sensitivity. The calculating part 74 changes the proper FP flash intensity Ifp to the value equal to the minimum FP flash intensity Ifpmin. The calculating part 74 and the setting part 72 change the set value of the sensitivity to the recommended sensitivity. The display part 70 changes the displayed value of the sensitivity to the recommended sensitivity and clears the display of the recommended object distance. Thereafter, the flow advances to step S43 shown in FIG. 7.

[Step S34]

The display part 70 has already displayed the recommended object distance at step S31. The setting part 72 causes the display part 70 to switch the current screen to the screen for object distance input so as to prompt the user to re-input the object distance. When the user re-inputs the object distance, the flow returns to step S2 shown in FIG. 4. When the user does not re-input the object distance, the flow advances to step S35.

[Step S35]

The calculating part 74 and the setting part 72 change the set value of the object distance to the recommended object distance. The display part 70 clears the display of the recommended object distance and changes the displayed value of the object distance to the recommended object distance. The calculating part 74 changes the proper FP flash intensity Ifp to the value equal to the minimum FP flash intensity Ifpmin and sends the changed proper FP flash intensity Ifp to the emission control part 78. To shoot an object with a proper exposure amount, the user needs to move so as to have the actual object distance be closer to a value displayed on the display part 70. Thereafter, the flow advances to step S43.

[Step S36]

When the proper FP flash intensity Ifp is equal to or smaller than the maximum FP flash intensity Ifpmax (determined by the calculating part 74), the flow advances to step S43 shown in FIG. 43. When the proper FP flash intensity Ifp is larger than the maximum FP flash intensity Ifpmax, the flow advances to step S37.

[Step S37]

The calculating part 74 communicates with the CPU 48 and determines whether or not the f-number can be increased. When the f-number cannot be increased, the flow advances to step S39. When the f-number can be increased, the flow advances to step S38.

[Step S38]

The calculating part 74 sets for a recommended exposure time an exposure time equal to or longer than the X-Sync shutter speed. In addition, the calculating part 74 calculates as a recommended f-number an f-number which allows the exposure value Ev given by expression (7) not to vary even if the exposure time is changed to the recommended exposure time. The recommended f-number is larger than the set f-number. The calculating part 74 commands the CPU 48 to change the exposure time and the f-number to the recommended exposure time and the recommended f-number, respectively. Accordingly, the CPU 48 changes the exposure time and the f-number. The calculating part 74 and the setting part 72 change the set values of the f-number and the exposure time to the recommended exposure time and the recommended f-number, respectively. The display part 70 changes the displayed values of the f-number and the exposure time to the recommended f-number and the recommended exposure time, respectively. The emission control part 78 instructs the light-emitting part 64 to switch the flash mode to the discrete flash mode. Thereafter, the flow returns to step S11 shown in FIG. 5.

[step S39]

The calculating part 74 communicates with the CPU 48 and determines whether or not the sensitivity can be increased. When the sensitivity cannot be increased, the flow advances to step S39. When the sensitivity can be increased, the flow advances to step S40.

[Step S40]

The calculating part 74 calculates as a recommended sensitivity a sensitivity which allows the proper FP flash intensity Ifp to be equal to the maximum FP flash intensity Ifpmax.

The calculating part 74 commands the CPU 48 to increase the sensitivity to the recommended sensitivity. Accordingly, the CPU 48 changes the sensitivity. The calculating part 74 changes the proper FP flash intensity Ifp to the value equal to the maximum FP flash intensity Ifpmax. The calculating part 74 and the setting part 72 change the set value of the sensitivity to the recommended sensitivity. The display part 70 changes the displayed value of the sensitivity to the recommended sensitivity. Thereafter, the flow advances to step S43.

[Step S41]

The calculating part 74 calculates as a recommended object distance an object distance which allows the proper FP flash intensity Ifp to be equal to the maximum FP flash intensity Ifpmax. The recommended object distance is shorter than the object distance displayed on the display part 70. The display part 70 for example displays values of both of the object distance and the recommended object distance with blinking so as to warn the user that the value of the object distance is too large. The setting part 72 causes the display part 70 to switch the current screen to the screen for object distance input so as to prompt the user to re-input the object distance. When the user has re-input the object distance, the flow returns to step S2 shown in FIG. 4. When the user has not re-input the object distance, the flow advances to step S42.

[Step S42]

The calculating part 74 and the setting part 72 change the set value of the object distance to the recommended object distance. The display part 70 clears the display of the recommended object distance. In addition, the display part 70 changes the displayed value of the object distance to the recommended object distance. The calculating part 74 changes the proper FP flash intensity Ifp to the value equal to the maximum FP flash intensity Ifpmax. Thereafter, the flow advances to step S43 shown in FIG. 7. To take a picture with a proper exposure amount, the user needs to move to have the actual object distance closer to the displayed value of the display part 70.

[Step S43]

When the luminance of the object has varied, the photometry part 56 sends the latest value of the luminance of the object to the CPU 48. When at least one of the proper values of the f-number and the exposure time that the CPU 48 calculates has varied, the flow advances to step S44. When the proper values of both of the f-number and the exposure time that the CPU 48 calculates have not varied, the flow advances to step S47.

[Step S44]

The CPU 48 notifies the calculating part 74 and the setting part 72 that the proper values of the f-number and the exposure time have varied. In synchronization with that, the setting part 72 causes the display part 70 to display a blinking phrase such as "The luminance of the object has varied!" so as to warn the user that the proper values of the f-number and the exposure time have varied. Thereafter, the flow advances to step S45.

[Step S45]

When the user sets a photographing condition once again, the flow returns to step S2 shown in FIG. 4. When the user does not set a photographing condition once again, the flow advances to step S46.

[Step S46]

The CPU 48 switches to the automatic exposure mode. Thereafter, the flow returns to step S3 shown in FIG. 4.

[Step S47]

Three different processings are performed as follows.

(1) In the case that the angle of view (focal length) has varied while the light-emitting part 64 is in the discrete flash mode:

The distance measuring part 22 sends the varied focal length to the calculating part 74 through the CPU 48. The calculating part 74 newly calculates the angle of view, the maximum discrete flash intensity Idmax, and the minimum discrete flash intensity Idmin from the varied focal length. Thereafter, the flow returns to step S12 in FIG. 5.

(2) In the case that the angle of view (focal length) has varied while the light-emitting part 64 is in the FP flash mode:

The distance measuring part 22 sends the varied focal length to the calculating part 74 through the CPU 48. The calculating part 74 newly calculates the angle of view, the maximum FP flash intensity Ifpmax, and the minimum FP flash intensity Ifpmin from the varied focal length. Thereafter, the flow returns to step S30 shown in FIG. 6.

(3) In the case that the angle of view has not varied:

The calculating part 74 sends the angle of view to the emission control part 78. When the light-emitting part 64 is in the discrete flash mode, the calculating part 74 sends the proper discrete flash intensity Id to the emission control part 78. When the light-emitting part 64 is in the FP flash mode, the calculating part 74 sends the proper FP flash intensity Ifp to the emission control part 78. The emission control part 78 commands the light-emitting part 64 to cause the illuminating angle of the light-emitting part 64 to become slightly larger than the angle of view. Thereafter, the flow advances to step S48.

[Step S48]

When the release button 52 is fully pressed, the flow advances to step S49. When the release button 52 is released, the flow returns to step S2.

[Step S49]

The CPU 48 causes the focal plane shutter 38 to operate in the exposure time that has been set and exposes the CCD 40. The emission control part 78 commands the light-emitting part 64 to emit light in synchronization with the exposure time according to a flash start signal received from the CPU 48 through the calculating part 74. When the light-emitting part 64 is in the discrete flash mode, the light-emitting part 64 flashes with the proper discrete flash intensity Id. When the light-emitting part 64 is in the FP flash mode, the light-emitting part 64 flashes with the proper FP flash intensity Ifp. Thereafter, the image-data processing part 42 reads electric charge from the CCD 40 and generates image data. The recording part 44 records the generated image data to a flash memory (the photographing operation is completed).

<Example of Display of Display Part>

Next, an example of a display of the display part 70 will be described. It should be noted that values described below do not limit the present invention. It is assumed that the X-Sync shutter speed is to be $1/250$ second and that ISO number is to be changeable in the range of 25 to 400.

Figure 8:
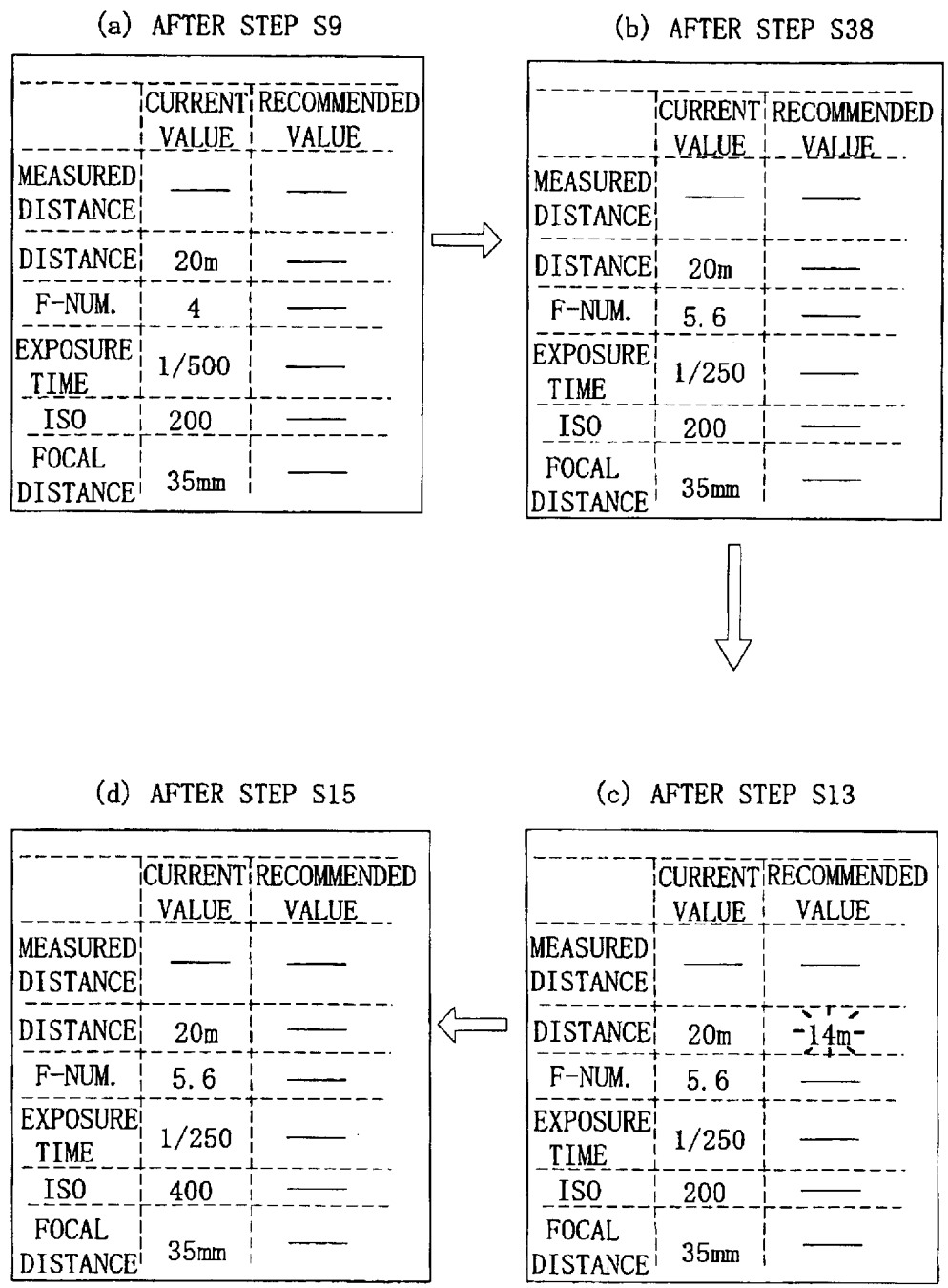
FIG. 8 is a schematic diagram describing an example of a display of the display part.

FIG. 8 shows an example of a display of the display part 70. FIG. 8A shows a photographic condition set in steps S1, S2, S8, and S9 that the object distance is 20 meters; the f-number 4; the exposure time is $1/500$ second; the ISO number (sensitivity) is 200; and the focal length is 35 millimeters.

It is assumed that thereafter, the light-emitting part 64 is to be switched to the FP flash mode and as a result the proper FP flash intensity Ifp calculated at step S29 is to be larger than the maximum FP flash intensity Ifpmax. In this case, the processing of step S38 is performed. The display part 70 for example changes the displayed values of the f-number and the exposure time to the recommended f-number, 5.6, and the recommended exposure time, $1/250$ second, respectively (see FIG. 8B). The emission control part 78 causes the light-emitting part 64 to switch the flash mode to the discrete flash mode.

It is assumed that thereafter, the proper discrete flash intensity Id calculated at step S11 is to be larger than the maximum discrete flash intensity Idmax. In this case, the processing of step 13 is performed. The display part 70 displays the recommended object distance, 14 meters with blinking (see FIG. 8C). Thereafter, the processing of step S14 is performed. It is assumed that when the ISO number is increased to 400 at step S14, the proper discrete flash intensity Id becomes equal to the maximum discrete flash intensity Idmax. In this case, at step S15, the display part 70 changes the displayed value of the sensitivity and clears the display of the recommended object distance (see FIG. 8D).

Figure 9:
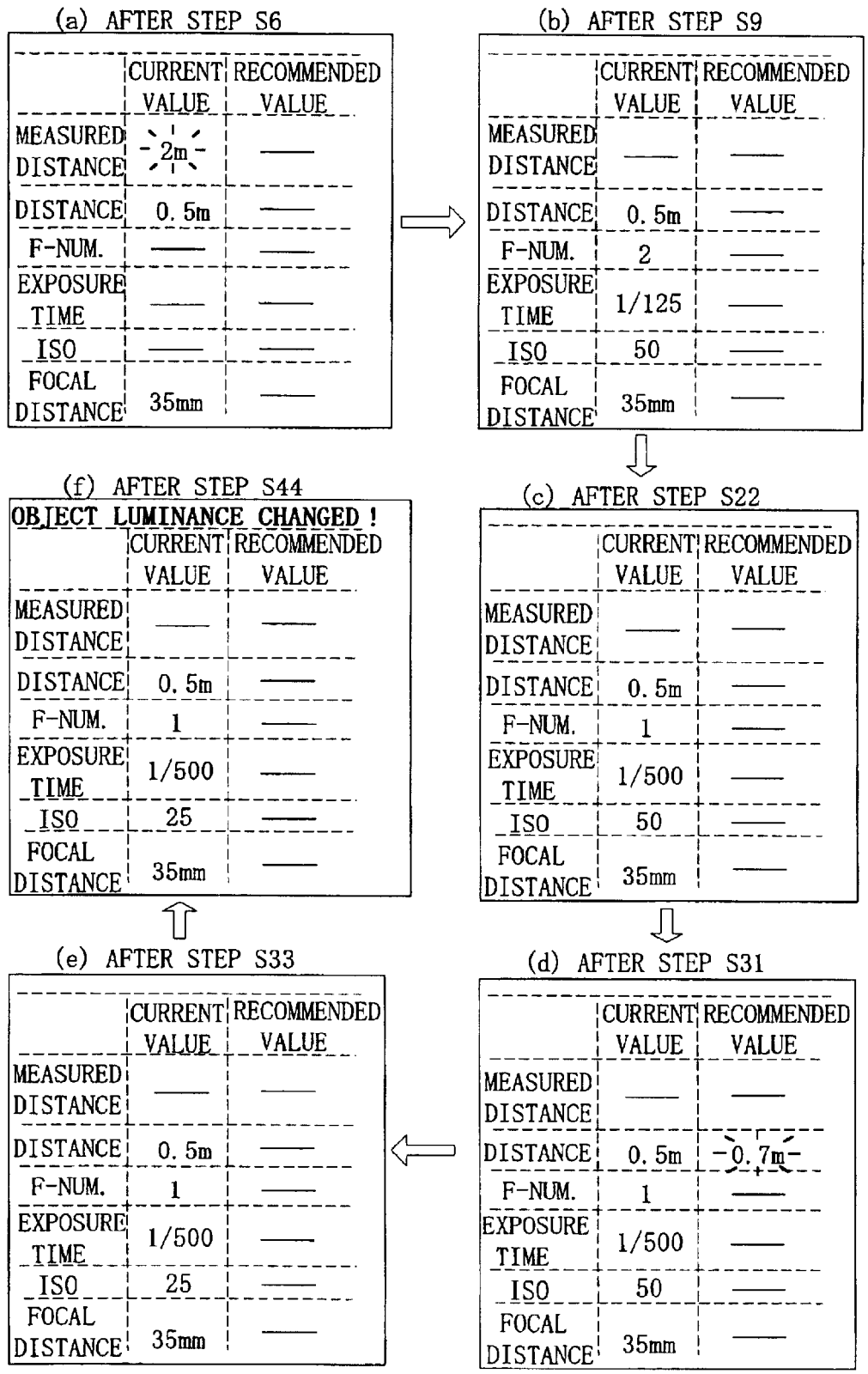
FIG. 9 is a schematic diagram describing an example of a display of the display part.

FIG. 9 shows another example of a display of the display part 70. FIG. 9A shows a display of warning (at step S6) after an object distance of 0.5 meter is input at step S2 and a measured distance of 2 meters is sent to the calculating part 74 at step S4. FIG. 9B shows the case that thereafter, the object distance is not changed and that the f-number is set to 2; the exposure time is set to ⅟₁₂₅ second; the ISO number is set to 50; and the focal length is set to 35 millimeters at steps S8 and S9.

It is assumed that thereafter, the light-emitting part 64 is to be switched to the discrete flash mode and that the proper discrete flash intensity Id calculated at step S11 is to be smaller than the minimum discrete flash intensity Idmin. In this case, the processings of steps 21 and 22 are performed. The display part 70 changes the displayed values of the f-number and the exposure time to the recommended f-number, for example 1, and the recommended exposure time, for example ⅟₅₀₀ second, respectively (see FIG. 9C). The emission control part 78 causes the light-emitting part 64 to switch the flash mode to the FP flash mode.

It is assumed that thereafter, the proper FP flash intensity Ifp calculated at step S29 is to be smaller than the minimum FP flash intensity Ifpmin. In this case, the processing of step S31 is performed. The display part 70 displays a value of the recommended object distance, 0.7 meter with blinking (see FIG. 9D).

Now, it is assumed that when the ISO number is to be decreased to 25, the proper FP flash intensity Ifp is to be increased to the minimum FP flash intensity Ifpmin. In this case, the processing of step S33 is performed. The display part 70 changes the displayed value of the sensitivity and clears the display of the recommended object distance (see FIG. 9E).

Thereafter, a variance in the luminance of the object results in changing the CPU 48's calculation of the proper values of the f-number and the exposure time. In this case, the processing of step S44 is performed. The display part 70 displays a blinking phrase "The luminance of the object has varied!" as a warning to the user (see FIG. 9F). In the present embodiment, the proper flash intensity and the flash mode are not displayed because too many parameters on display may confuse the user and he or she may not tell which one to check.

<Effects of Present Embodiment>

In the conventional electronic flash device the user has to select a flash intensity, and it automatically sets the discrete flash mode or the FP flash mode according to an exposure time, and displays a proper object distance according to the selected flash intensity. Therefore, the automatic flash mode switching occurring with a variance in the exposure time due to a variance in the luminance of the object changes the proper object distance for display.

In contrast, in the electronic flash device according to the present embodiment the user is the one to input an object distance, and it automatically sets the discrete flash mode or the FP flash mode according to an exposure time calculated in the camera side, and calculates a proper flash intensity in the set flash mode according to the input object distance and the exposure time, the f-number, and the sensitivity calculated in the camera side. Because of this, even beginner-level users who are not familiar with the settings of the flash modes such as the discrete flash, FP flash, 1/2 flash can easily set an appropriate flash intensity for setting a proper exposure amount.

In addition, the present invention proposes an advantageous method for switching a flash mode in a case where the maximum flash intensity in the discrete flash mode is larger than that in the FP flash mode and where the minimum flash intensity in the FP flash mode is smaller than that in the discrete flash mode. In other words, when the proper discrete flash intensity Id is smaller than the minimum discrete flash intensity Idmin, the calculating part 74 performs control to switch the flash mode to the FP flash mode. This is because even if the proper flash intensity in the discrete flash mode is below the emittable range, there is a possibility that the proper flash intensity in the FP flash mode is in the emittable range. Likewise, when the proper FP flash intensity Ifp is larger than the maximum FP flash intensity Ifpmax, the calculating part 74 sets the exposure time to X-Sync shutter speed or higher and switches the flash mode to the discrete flash mode. This is because even if the proper flash intensity in the FP flash mode is above the emittable range, there is a possibility that the proper flash intensity in the discrete flash mode is in the emittable range. Thus, in conformity with the calculated proper flash intensity, the electronic flash device can properly switch the flash mode.

At the time of switching the flash mode, the electronic flash device automatically changes the f-number in accordance with a variance in the exposure time so as to prevent a variance in exposure value Ev. This makes it possible to switch the flash mode without changing the exposure amount illuminated to the CCD 40 at shooting.

Further, at the time of switching the flash mode, the electronic flash device automatically changes the exposure time and the f-number without changing the object distance and the sensitivity, and calculates a new proper flash intensity in the switched flash mode. This enables the automatic setting of a photographing condition for setting a proper exposure amount without troubling the user in deciding the flash mode from the discrete and FP flash modes.

When the calculated proper flash intensity is outside the emittable range, the calculating part 74 does not change the object distance but performs control to emit light with the maximum or minimum flash intensity and illuminate an object with the proper exposure amount. In other words, when the proper flash intensity (Id/Ifd) is smaller than the minimum flash intensity (Idmin/Ifpmin), by decreasing the sensitivity or increasing the f-number and the exposure time, the proper flash intensity is increased to the minimum flash intensity. Likewise, when the proper flash intensity (Id/Ifp) is larger than the maximum flash intensity (Idmax/Ifpmax), by increasing the sensitivity or decreasing the f-number and the exposure time, the proper flash intensity is decreased to the maximum flash intensity. Thus, when the calculated proper flash intensity is outside the flash emittable range, the electronic flash device is capable of automatically setting a photographing condition in which flash is emitted with the maximum or minimum flash intensity and an object is illuminated with a proper exposure amount, without the necessity for the user to change the object distance as much as possible. In other words, the user can shoot an object with flash with a proper exposure amount by setting an object distance, an f-number, an exposure time, and sensitivity just once.

When the calculated proper flash intensity is above the flash emittable range, the electronic flash device displays a recommended object distance to warn the user. The recommended object distance is a distance needed for decreasing the proper flash intensity to the maximum flash intensity. Likewise, when the proper flash intensity is below the flash emittable range, the electronic flash device displays a recommended object distance as a warning to the user. The recommended object distance in this case is a distance needed for increasing the proper flash intensity to the minimum flash intensity. Thus, the user can know how long the object distance should be altered in order to set a proper flash intensity for setting a proper exposure amount without changing other photographing conditions. In other words, the user can shoot an object with a proper exposure amount by only changing the object distance to the recommended object distance. Thus, if the user cannot change photographing conditions except for an object distance, the user can shoot an object with the proper exposure amount only by changing the object distance to the recommended object distance. When the proper value of the f-number or the exposure time calculated in the camera side has varied, the electronic flash device displays "The luminance of the object has varied!" as a warning to the user (at step S44). Thus, if a photographing condition has changed after setting an f-number, an exposure time, and so forth to their proper values, the user can easily recognize the change. After step S44, the electronic flash device allows the user to re-set a photographing condition or the camera to automatically re-set a photographing condition. Thereafter, the electronic flash device calculates a new proper flash intensity (at steps S45 and S46). As a result, the camera can be prevented from shooting with an inappropriate exposure amount that is outside a range of proper exposure amounts.

The electronic flash device performs control to allow the illuminating angle to be slightly larger than the angle of view. When the angle of view has varied with a variance in the focal length, the electronic flash device determines whether or not the proper flash intensity is in the flash emittable range once again. Thus, even if the variance in the angle of view changes the proper flash intensity to a value outside the emittable range, the electronic flash device can automatically set a photographing condition in which flash is emitted with the maximum or minimum flash intensity to illuminate an object with a proper exposure amount. In other words, the electronic flash device can automatically set a best photographing condition for setting a proper exposure amount even if the user changes the focal length after setting a photographing condition. Therefore, the electronic flash device can automatically set the best photographing condition for setting a proper exposure amount without the necessity for the user to care about the illuminating angle.

In a case where the difference between the input object distance and the object distance measured by the camera side is large, the electronic flash device displays the distance measured by the camera side as a warning to the user. Thus, even if the user inputs an erroneous object distance, he or she can easily recognize the error. Consequently, the electronic flash device can be prevented from flashing with an inappropriate exposure amount which is outside a range of proper exposure amounts.

<Supplementary of Present Embodiment>

[1] The foregoing embodiment describes an example of which the electronic flash device according to the present invention is attached to an electronic camera (camera 12). However, it should be noted that the electronic flash device of the present invention is not limited to such an embodiment, and it may be used with a camera that uses a film. In this case, the processings at steps S14, S25, S32, and S39 should be done on the assumption that the sensitivity (of a film) is to be unchangeable.

[2] The foregoing embodiment describes an example of which the electronic flash device 16 according to the present invention is attached to the camera 12 which can exchange data therewith. However, it should be noted that the electronic flash device of the present invention is not limited to such an embodiment, it may be used with a camera that cannot exchange data therewith. In this case, for example, the operations and functions of the flash control device will be modified in the following ways.

Firstly, the setting part 72 is modified so that the user can input an f-number, a sensitivity, an exposure time, a focal length, and an X-Sync shutter speed of the camera by manipulating the operation switch buttons. In addition, the setting part 72 is modified so that the user can input the maximum and minimum values of an f-number, a sensitivity, and an exposure time that the camera can set.

Secondly, at step S9, the user inputs an f-number, an exposure time, a sensitivity, a focal length, and an X-Sync shutter speed to the setting part. In addition, the user inputs the maximum and minimum values of an f-number, a sensitivity, and an exposure time that the camera can set.

Thirdly, at steps S15, S24, S33, and S40, a recommended sensitivity is displayed on the display part. Thereafter, the user changes the sensitivity of the camera to the recommended sensitivity.

Fourthly, at steps S17, S22, S24, and S38, a recommended f-number and a recommended exposure time are displayed on the display part. Thereafter, the user changes an f-number and an exposure time of the camera to the recommended f-number and the recommended exposure time, respectively.

Fifthly, at step S43, proper values of an f-number and an exposure time are not changed.

Sixthly, at step S47, the angle of view is not changed.

[3] In the foregoing embodiment, an exposure time is decreased to the X-Sync shutter speed or shorter and an f-number is decreased at step S22. Thereafter, the flash mode is switched to the FP flash mode. However, the present invention is not limited to such an example. The flash mode may be changed to the FP flash mode without changing an exposure time and an f-number.

[4] The foregoing embodiment describes an example where the proper discrete flash intensity Id is calculated by expression (3), which is calculated by expression (1). However, it should be noted that the present invention is not limited to such an embodiment. In other words, expression (1) substantially represents a proper light amount that may contain a quantization error or that may be truncated as counting fractions of 0.5 or over as a unit and cut away the rest. This applies to the calculation of the proper FP flash intensity Ifp (Expressions (4) and (6)).

[5] The foregoing embodiment describes an example where a value of a recommended object distance is displayed to warn the user when a proper flash intensity is above an emittable (flashable) range. However, the present invention is not limited to such an embodiment. For example, the recommended object distance may be notified to the user as an audio warning such as "Change the object distance to 2 meters." Likewise, changes of proper values of an f-number and an exposure time are also notified to the user on audio (at step S44).

[6] The foregoing embodiment describes an example of which an illuminating angle of light emission is slightly larger than an angle of view. However, it should be noted that the present invention is not limited to such an embodiment. The illuminating angle may be equal to the angle of view or the minimum flash intensity can be further decreased by increasing the illuminating angle if the calculated proper flash intensity is smaller than the minimum flash intensity.

[7] The foregoing embodiment describes an example of which the calculated proper flash intensity (Id/Ifp) and information on the currently set flash mode (discrete flash/FP flash) are not displayed. However, it should be noted that the present invention is not limited to such an embodiment. The proper flash intensity and the information on the flash mode may be displayed.

The invention is not limited to the above embodiments and various modifications may be made without departing from the spirit and scope of the invention. Any improvement may be made in part or all of the components.

What is claimed is:

1. A flash control device for use with an electronic flash device having switchable flash modes as a discrete flash mode for a discrete flash and an FP flash mode for an FP flash, the flash control device comprising:

a distance input part for inputting an object distance;

a calculating part for calculating a proper flash intensity in accordance with the object distance and an f-number, a sensitivity, and an exposure time of a camera when the electronic flash device is in the FP flash mode, and for calculating the proper flash intensity in accordance with the object distance, the f-number, and the sensitivity when the electronic flash device is in the discrete flash mode, the proper flash intensity being a degree of intensity necessary for illuminating an object with a proper light amount; and an emission control part for instructing the electronic flash device to flash with the proper flash intensity, wherein flash control is performed so that the object is illuminated with the proper exposure amount.

2. The flash control device as set forth in claim 1, wherein when the electronic flash device is in the discrete flash mode, the calculating part calculates the proper flash intensity which is proportional to a square of the object distance and a square of the f-number and is inversely proportional to the sensitivity; and when the electronic flash device is in the FP flash mode, the calculating part calculates the proper flash intensity so that it is proportional to the square of the object distance and the square of the f-number and is inversely proportional to the sensitivity and the exposure time.

3. The flash control device as set forth in claim 1, wherein:

when the exposure time is shorter than an X-Sync shutter speed of a shutter of the camera, the emission control part switches the flash mode of the electronic flash device to the FP flash mode; and when the flash mode of the electronic flash device is switched, the calculating part calculates a new proper flash intensity without changing the object distance.

4. The flash control device as set forth in claim 3, wherein:

when the electronic flash device is in the discrete flash mode, the calculating part determines whether or not the proper flash intensity is within a range in which the electronic flash device is emittable of the discrete flash;

when the proper flash intensity is larger than a maximum flash intensity of the discrete flash, the calculating part instructs the camera to perform at least one of an operation for decreasing the exposure time and the f-number and an operation for increasing the sensitivity; and when the proper flash intensity is smaller than a minimum flash intensity of the discrete flash, the emission control part switches the flash mode of the electronic flash device to the FP flash mode.

5. The flash control device as set forth in claim 4, wherein:

when the electronic flash device is in the FP flash mode, the calculating part determines whether or not the proper flash intensity is within a range in which the electronic flash device is emittable of the FP flash;

when the proper flash intensity is larger than a maximum flash intensity of the FP flash, the calculating part instructs the camera to increase the f-number and lengthen the exposure time to a value longer than the X-Sync shutter speed, and the emission control part switches the flash mode of the electronic flash device to the discrete flash mode; and when the proper flash intensity is smaller than the minimum flash intensity of the FP flash, the calculating part instructs the camera to decrease the sensitivity.

6. The flash control device as set forth in claim 5, further comprising a warning part for issuing a warning, wherein:

the calculating part has an acquiring part for acquiring, as a measured distance, a distance between the object and the camera, the distance being measured by the camera;

when the object distance has not been input, the calculating part calculates the proper flash intensity in accordance with the measured distance instead of the object distance; and the warning part issues a warning when the calculating part determines that the measured distance is largely different from the object distance.

7. The flash control device as set forth in claim 1, wherein the calculating part determines whether or not the proper flash intensity is within a range in which the electronic flash device is emittable, and calculates, when the proper flash intensity falls outside the emittable range, a modified value of at least one of the object distance, the f-number, the sensitivity, and the exposure time so as to allow the proper flash intensity to be a value within the emittable range.

8. The flash control device as set forth in claim 1, wherein:

when the electronic flash device is in the FP flash mode, the calculating part determines whether or not the proper flash intensity is larger than a maximum flash intensity of the FP flash; and upon determining that the proper flash intensity is larger than the maximum flash intensity, the calculating part instructs the camera to increase the f-number and lengthen the exposure time to a value longer than an X-Sync shutter speed of a shutter of the camera, and the emission control part switches the flash mode of the electronic flash device to the discrete flash mode.

9. The flash control device as set forth in claim 1, wherein:

when the electronic flash device is in the discrete flash mode, the calculating part determines whether or not the proper flash intensity is larger than a maximum flash intensity of the discrete flash; and upon determining that the proper flash intensity is larger than the maximum flash intensity, the calculating part instructs the camera to perform at least one of an operation for decreasing the exposure time and the f-number and an operation for increasing the sensitivity.

10. The flash control device as set forth in claim 1, wherein:

when the electronic flash device is in the discrete flash mode, the calculating part determines whether or not the proper flash intensity is smaller than the minimum flash intensity of the discrete flash; and upon determining that the proper flash intensity is smaller than the minimum flash intensity, the emission control part switches the flash mode of the electronic flash device to the FP flash mode.

11. The flash control device as set forth in claim 1, wherein:

when the electronic flash device is in the FP flash mode, the calculating part determines whether or not the proper flash intensity is smaller than a minimum flash intensity of the FP flash; and upon determining that the proper flash intensity is smaller than the minimum flash intensity, the calculating part instructs the camera to decrease the sensitivity.

12. The flash control device as set forth in claim 1, further comprising a warning part for issuing a warning, wherein:

the calculating part has an acquiring part for acquiring, as a measured distance, a distance between the object and the camera, the distance being measured by the camera; and the warning part issues a warning when the calculating part determines that the measured distance is largely different from the object distance.

13. The flash control device as set forth in claim 12, wherein when the object distance has not been input, the calculating part calculates the proper flash intensity in accordance with the measured distance instead of the object distance.

14. The flash control device as set forth in claim 1, further comprising a notifying part for notifying a recommended object distance to a user, wherein:

the calculating part determines whether or not the proper flash intensity is larger than a maximum flash intensity of the electronic flash device, and calculates, upon determining that the proper flash intensity is larger than the maximum flash intensity, as the recommended object distance, the object distance at such a value that the proper flash intensity becomes closest to the maximum flash intensity of the electronic flash device; and the calculating part determines whether or not the proper flash intensity is smaller than a minimum flash intensity of the electronic flash device, and calculates, upon determining that the proper flash intensity is smaller than the minimum flash intensity, as the recommended object distance, the object distance at such a value that the proper flash intensity becomes closest to the minimum flash intensity of the electronic flash device.

15. The flash control device as set forth in claim 1, further comprising a notifying part for notifying a recommended object distance to a user, wherein:

the calculating part determines whether or not the proper flash intensity is within a range in which the electronic flash device is emittable;

when a maximum flash intensity of the electronic flash device has become smaller than the proper flash intensity due to a variance in at least one of the f-number, the exposure time, and an illuminating angle of a light-emitting part of the electronic flash device, the calculating part calculates as the recommended object distance the object distance at such a value that the proper flash intensity becomes closest to the maximum flash intensity of the electronic flash device; and when a minimum flash intensity of the electronic flash device has become larger than the proper flash intensity due to a variance in at least one of the f-number, the exposure time, and the illuminating angle, the calculating part calculates as the recommended object distance the object distance at a such value that the proper flash intensity becomes closest to the minimum flash intensity.

16. The flash control device as set forth in claim 1, further comprising a warning part for issuing a warning, wherein:

the calculating part determines whether or not the proper flash intensity is within a range in which the electronic flash device is emittable; and the warning part issues a warning when the proper flash intensity falls outside the emittable range due to a variance in at least one of the f-number, the exposure time, and an illuminating angle of a light-emitting part of the electronic flash device.

17. The flash control device as set forth in claim 16, further comprising a notifying part for notifying a recommended object distance to a user, wherein:

when a maximum flash intensity of the electronic flash device has become smaller than the proper flash intensity due to a variance in at least one of the f-number, the exposure time, and the illuminating angle, the calculating part calculates as the recommended object distance, the object distance at such a value that the proper flash intensity becomes closest to the maximum flash intensity of the electronic flash device; and when a minimum flash intensity of the electronic flash device has become larger than the proper flash intensity due to a variance in at least one of the f-number, the exposure time, and the illuminating angle, the calculating part calculates as the recommended object distance the object distance at a such value that the proper flash intensity becomes closest to the minimum flash intensity.

18. the flash control device as set forth in claim 17, further comprising a warning part for issuing a warning, wherein:

the calculating part has an acquiring part for acquiring, as a measured distance, a distance between the object and the camera, the distance being measured by the camera;

when the object distance has not been input, the calculating part calculates the proper flash intensity in accordance with the measured distance instead of the object distance; and the warning part issues a warning when the calculating part determines that the measured distance is largely different from the object distance.

19. An electronic flash device having switchable flash modes as a discrete flash mode for a discrete flash and an FP flash mode for an FP flash, the electronic flash device comprising:

the flash control device as set forth in claim 1; and a light-emitting part.

20. A photographing system, comprising:

an electronic flash device having the flash control device as set forth in claim 1 and a light-emitting part, and having switchable flash modes as a discrete flash mode for a discrete flash and an FP flash mode for an FP flash; and a camera having an image pickup part for picking up an image of an object.

* * * * *